United States Patent [19]

Albanes

[11] Patent Number: 5,714,807
[45] Date of Patent: Feb. 3, 1998

[54] ANTI-THEFT LOCK FOR AUTOMOTIVE VEHICLES WHICH LOCKS AN AUTOMATIC TRANSMISSION

[76] Inventor: Pedro Albanes, 250 S. Coconut La., Miami Beach, Fla. 33139

[21] Appl. No.: 634,378

[22] Filed: Apr. 18, 1996

[51] Int. Cl.⁶ .................................................... B60R 25/00
[52] U.S. Cl. ........................... 307/10.2; 70/245; 180/287
[58] Field of Search .................................. 307/9.1–10.6;
180/287; 74/411.5; 70/237, 245, 246, 247,
248, 251, 254, 256; 340/425.5, 426, 825.3–825.32,
825.69, 825.72

[56] References Cited

U.S. PATENT DOCUMENTS

| | | | |
|---|---|---|---|
| 1,764,383 | 6/1930 | Bezek | 70/256 |
| 3,939,939 | 2/1976 | Ozazaki | 70/245 |
| 4,837,567 | 6/1989 | Kleefeldt et al. | 340/825.31 |
| 4,884,654 | 12/1989 | Duringon | 180/287 |
| 5,049,867 | 9/1991 | Stouffer | 340/426 |
| 5,179,868 | 1/1993 | Thibeault | 70/248 |
| 5,280,282 | 1/1994 | Nagafusa et al. | 340/425.5 |
| 5,431,244 | 7/1995 | Possobom | 70/287 |
| 5,544,508 | 8/1996 | Torkowski | 70/257 |

Primary Examiner—Richard T. Elms
Attorney, Agent, or Firm—J. Sanchelima

[57] ABSTRACT

An anti-theft device for a vehicle includes a control configuration having a first terminal for outputting a lock signal and a second terminal for outputting an unlock signal. The device also includes a push-pull gear motor having a first terminal connected to the first terminal of the control configuration and a second terminal connected to the second terminal of the control configuration. The motor has an actuator movable between an extended and a retracted position upon receiving the signals. The anti-theft device further includes a pivotal locking device connected to the actuator. The pivotal locking device is in a locked position when the actuator is in one of the positions and is in an unlocked position when the actuator is in the other of the positions. The locking device engages a first end of an operative connection when the locking device is in the locked position. The operative connection has a second end for connection either to a gear lever of an automatic transmission or a clutch lever of a transmission and a clutch pedal arm. The control configuration causes the locking device to engage the operative connection by outputting the lock signal to disable gear selection of the vehicle and the control configuration outputs the unlock signal to enable gear selection of the vehicle.

7 Claims, 4 Drawing Sheets

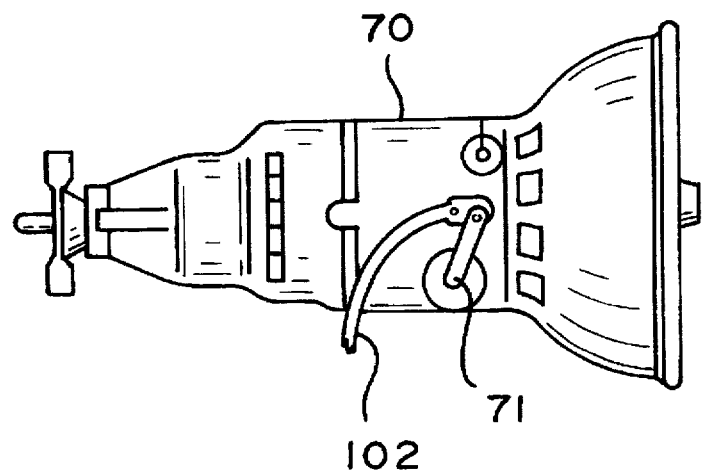
FIG. 5
FIG. 6
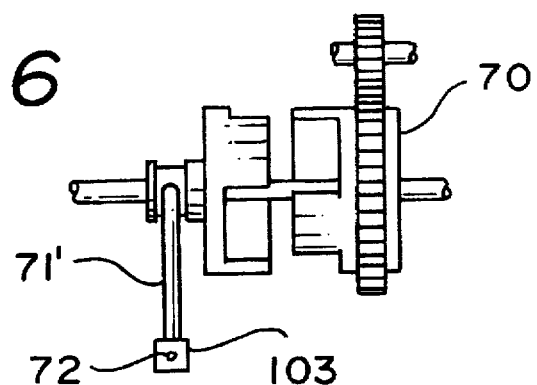
FIG. 8
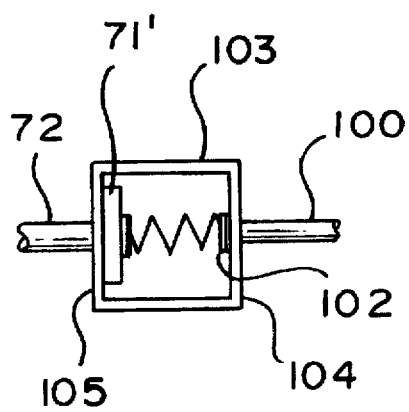
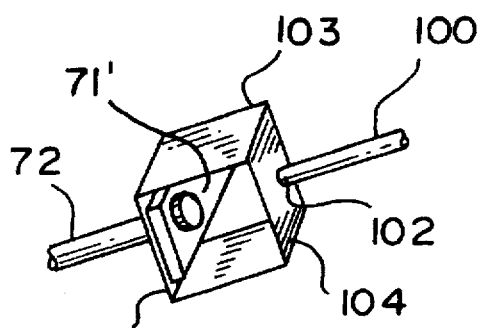
FIG. 7

ANTI-THEFT LOCK FOR AUTOMOTIVE VEHICLES WHICH LOCKS AN AUTOMATIC TRANSMISSION

BACKGROUND OF THE INVENTION

1. Field of the Invention

The invention relates to an anti-theft lock for automotive vehicles which disables an automatic transmission or, in the case of a manual transmission, disables the clutch.

2. Description of the Related Art

U.S. Pat. No. 4,884,654 discloses a transmission control locking device. A locking rod with a slot formed therein is mounted on a clutch operating lever. The locking rod is free to slide in a bore formed in a locking frame having slots for receiving a tapered locking plate mounted for movement at right angles to the locking rod.

The locking plate is operated by a plunger of a solenoid through the use of a pivotable arm. A coil spring is connected between the end of the pivotable arm, to which the locking plate is connected, and the locking frame. The coil spring urges the locking plate towards the locking frame. The solenoid is controlled by an electronic circuit which switches power to the solenoid according to the state of a control signal on an input.

The device locks the clutch operating lever with the locking plate when the solenoid is de-energized. Energization of the solenoid allows disengagement of the clutch and permits normal operation thereof.

U.S. Pat. No. 5,431,244 disclose a locking device having an enclosed box, an actuating pin mounted inside a double action solenoid and relay to command the solenoid. The solenoid is double action because it commands the actuating pin forward and back. The actuating pin actuates in a slot in a part assembled on the reverse shift bar.

U.S. Pat. No. 5,179,868 discloses a motor vehicle transmission locking device for use with automatic and manual transmissions. The device uses a solenoid to lock a pin in a notch formed on an existing transmission parking shaft to lock the transmission in the parked position. The solenoid is mounted on the inside of the transmission case and may be activated by an encoder/decoder circuit and may be activated by a switch.

Each of those known locking devices utilize a solenoid to actuate locking means. Solenoids, however, have the disadvantage that a loss of power causes the solenoid to deenergize and change position. Therefore, if the device is in the locked position when the solenoid is energized, a thief need only disconnect power to the solenoid to defeat the device. On the other hand, if the device is in the unlocked position when the solenoid is energized, the device may lock upon loss of power while the vehicle is being operated creating a hazardous driving condition.

Additionally, each of the known devices utilize some type of rigid rod to lock the drive train of a vehicle. Consequently, the device must be installed near the transmission or clutch. Installation of such devices is hindered, as a result, since the clutch and transmission may not be easily accessible or sufficient space may not be available on many vehicle models.

SUMMARY OF THE INVENTION

It is accordingly an object of the invention to provide a anti-theft lock for automotive vehicles, which overcomes the above-mentioned disadvantages of the heretofore-known devices and methods of this general type and which does not lock or unlock upon loss of power and which may be installed remotely from the transmission or clutch.

With the foregoing and other objects in view there is provided, in accordance with the invention, an anti-theft device for a vehicle with an automatic transmission having a gear lever with a park position, comprising: a control configuration having a first terminal for outputting a lock signal and a second terminal for outputting an unlock signal; a push-pull gear motor having a first terminal connected to the first terminal of the control configuration for receiving the lock signal and a second terminal connected to the second terminal of the control configuration for receiving the unlock signal, the push-pull gear motor having an actuator movable between an extended and a retracted position upon receiving the signals, and being otherwise fixed in one of the positions; a pivotal locking device connected to the actuator, the locking device being in a locked position when the actuator is in one of the positions and being in an unlocked position when the actuator is in the other of the positions; and an operative connection having a first end being engaged by the locking device in the locked position, and a second end for connection to the gear lever of the transmission; and the control configuration causing the locking device to engage the operative connection by outputting the lock signal when the vehicle is in the park position for disabling gear selection of the vehicle by securing the gear lever in the park position and the control configuration outputting the unlock signal for enabling gear selection of the vehicle.

In accordance with an added feature of the invention, the control configuration includes a transmitter for transmitting the signals.

In accordance with an additional feature of the invention, the transmitter is a hand-held transmitter.

In accordance with another feature of the invention, the control configuration includes: an electronic module with an antenna for receiving the signals from the transmitter, a ground terminal connected to ground, a positive terminal connected to a positive terminal of a battery, a lock terminal for outputting the lock signal, and an unlock terminal for outputting the unlock signal, a lock relay being connected to the lock terminal of the electronic module and having a lock contact spring, the first terminal of the push-pull gear motor being connected to the lock contact spring, and an unlock relay being connected to the unlock terminal of the electronic module and having an unlock contact spring, the second terminal of the push-pull gear motor being connected to the unlock contact spring. Additionally, the electronic module may be the electronic module of a previously installed alarm or central lock system. Consequently, the lock and unlock signals sent by the transmitter to the electronic module may simultaneously operate the anti-theft device, an alarm, and central locks.

In accordance with a further feature of the invention, the pivotal locking device includes a pivotal lock element having a bore formed therein, a stationary pivot pin being disposed transversely to the actuator of the push-pull gear motor and passing through the bore in the pivotal lock element, and a pin connecting the actuator and the pivotal lock element, the pivotal lock element engaging the first end of the operative connection in the locked position.

In accordance with again an added feature of the invention, the pivotal lock element is v-shaped.

In accordance with again an additional feature of the invention, the operative connection is a rod or a cable.

The anti-theft device may be installed on any automotive vehicle transmission or clutch with minor changes. In some cases, the device may be installed near the transmission or clutch in such a way that a rod may be used for an operative connection. In other cases, the device may be installed remotely from the transmission or clutch with a cable as the operative connection for convenience. Additionally, the anti-theft device may be installed by a vehicle manufacturer at the factory or it may be installed after-market.

In accordance with again another feature of the invention, the rod or cable has a notch formed therein.

In accordance with again a further feature of the invention, the anti-theft device includes a guide having a bore disposed therein, the operative connection being guided in the bore of the guide.

With the objects of the invention view there is also provided, in accordance with the invention, an anti-theft device for a vehicle with a manual clutch having a clutch lever and a clutch pedal with a pressed position, the clutch pedal having a clutch pedal arm connected to the clutch lever. In this embodiment of the invention, the operative connection has a second end for connection to the clutch lever of the transmission and the clutch pedal arm. The control configuration causes the locking device to engage the operative connection by outputting the lock signal when the clutch pedal is in the pressed position for disabling gear selection of the vehicle by securing the clutch pedal in the pressed position. The control configuration outputs the unlock signal for enabling gear selection of the vehicle.

In accordance with an added feature of the invention, the anti-theft device includes a connector having a first bore formed therein, the second end of the operative connection passing through the first bore and being fixedly attached to the connector, the connector having a second bore formed therein for connecting the clutch lever and the clutch pedal arm.

In accordance with an additional feature of the invention, the anti-theft device includes a spring, the connector being hollow, and the spring being disposed in the connector for damping noises caused by connection of the clutch lever, the clutch pedal arm and the operative connection.

The anti-theft device may be installed on any automotive vehicle transmission or clutch with minor changes. In some cases, the device may be installed near the transmission or clutch in such a way that a rod may be used for an operative connection. In other cases, the device may be installed remotely from the transmission or clutch with a cable as the operative connection for convenience. Additionally, the anti-theft device may be installed by a vehicle manufacturer at the factory or it may be installed after-market.

Other features which are considered as characteristic for the invention are set forth in the appended claims.

Although the invention is illustrated and described herein as embodied in an anti-theft lock for automotive vehicles, it is nevertheless not intended to be limited to the details shown, since various modifications and structural changes may be made therein without departing from the spirit of the invention and within the scope and range of equivalents of the claims.

The construction of the invention, however, .together with additional objects and advantages thereof will be best understood from the following description of the specific embodiment when read in connection with the accompanying drawings.

BRIEF DESCRIPTION OF THE DRAWINGS

FIG. 5 is a side-elevational view of a transmission with a gear lever connected to a cable;

FIG. 6 is a side-elevational view of a clutch with a clutch lever connected to a clutch pedal arm and a cable;

FIG. 7 is a perspective view of the clutch lever connected to the clutch pedal arm and the cable; and FIG. 8 is a side-elevational view of the clutch lever connected to the clutch pedal arm and the cable.

DESCRIPTION OF THE PREFERRED EMBODIMENTS

Figure 1:
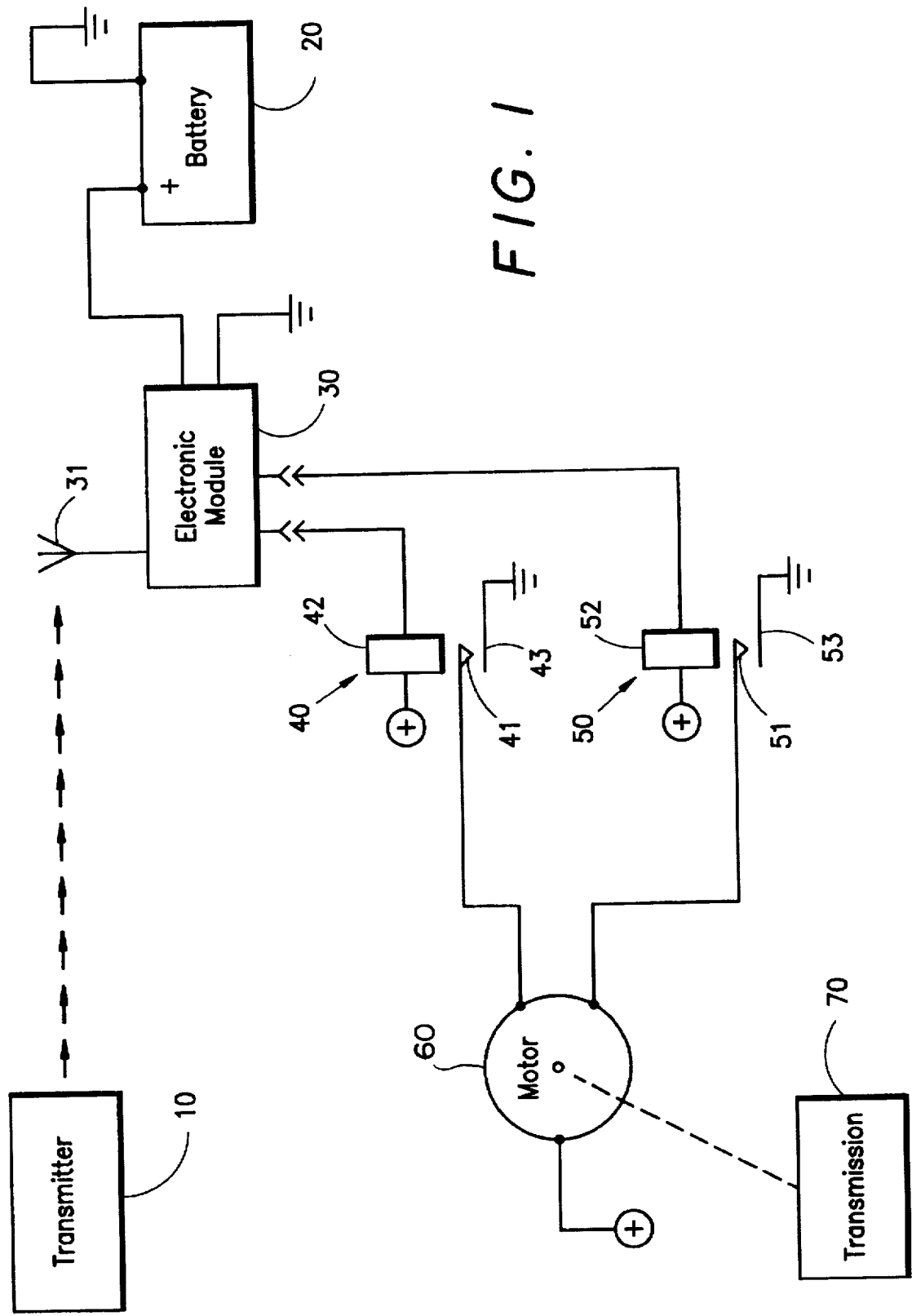
FIG. 1 is a schematic and block circuit diagram of a first embodiment of an anti-theft device according to the invention connected to a transmission.

Referring now to the figures of the drawings in detail and first, particularly, to FIG. 1 thereof, there is seen a first embodiment of an anti-theft device for locking a transmission of a vehicle with an automatic transmission. The anti-theft device includes an electronic module 30 with an antenna 31. The antenna 31 receives signals, a lock signal or an unlock signal, from a transmitter 10. A positive terminal on a battery 20 is connected to a positive terminal of the electronic module 30. A ground terminal of the electronic module 30 and a ground terminal on the battery 20 are connected to ground. The electronic module 30 has a lock terminal for sending a lock signal and an unlock terminal for sending an unlock signal.

According to the preferred embodiment, the electronic module is a Model CSM-3 electronic module manufactured by Code Alarm, Inc. (U.S. Pat. No. 5,049,867). The operating voltage for the CSM-3 is 10 V–18 V direct current. The transmitter 10 is sold together with the electronic module 30 by Code Alarm, Inc. In the preferred embodiment the transmitter is a hand-held transmitter with two buttons, one for sending a lock signal, the other for sending an unlock signal.

FIG. 1 also illustrates a lock relay 40 with a contact spring 41, a coil 42 and a contact 43 for transmitting a lock signal to a gear motor 60. The coil 42 is connected to the output terminal of the electronic module 30 for sending a lock signal. The coil 42 is connected to a positive potential and the contact 43 is connected to ground in the preferred embodiment. However, the coil 42 could alternatively be connected to ground if the contact 43 is connected to a positive potential. The contact spring 41 is connected to a terminal of the gear motor 60. If the relay 40 is activated by a lock signal from the electronic module 30, the contact spring 41 contacts the contact 43 and transmits the lock signal to the gear motor 60.

An unlock relay 50 is also illustrated in FIG. 1 with a contact spring 51, a coil 52 and a contact 53 for transmitting an unlock signal to the gear motor 60. The coil 52 is connected to the output terminal of the electronic module 30 for sending an unlock signal. The coil 52 is connected to a positive potential and the contact 53 is connected to ground in the preferred embodiment. Similar to the lock relay 40, the coil 52 could alternatively be connected to ground if the contact 53 is connected to a positive potential. The contact spring 51 is connected to another terminal of the gear motor 60. If the relay 50 is activated by an unlock signal from the electronic module 30, the contact spring 51 contacts the contact 53 and transmits the unlock signal to the gear motor 60.

In a preferred embodiment of the invention, the lock relay 40 and the unlock relay 50 are relays manufactured by Bosh, Inc.

The electronic module 30, the lock relay 40 and the unlock relay 50 may be placed at a convenient location on or in the vehicle. In an exemplary embodiment, they are located under the dash board of the vehicle.

The gear motor 60 illustrated in FIG. 1 is a push-pull gear motor. The gear motor 60 is also connected to a positive potential. If the gear motor 60 receives a lock signal a transmission 70 is locked by a mechanical mechanism (illustrated by a dashed line in FIG. 1) which will be further described hereinafter. If the gear motor 60 receives an unlock signal, the transmission 70 is unlocked by the same mechanism. According to the preferred embodiment, the gear motor 60 is a Model ALA50-DP motor manufactured by Magnadyne Corp.

Figure 2:
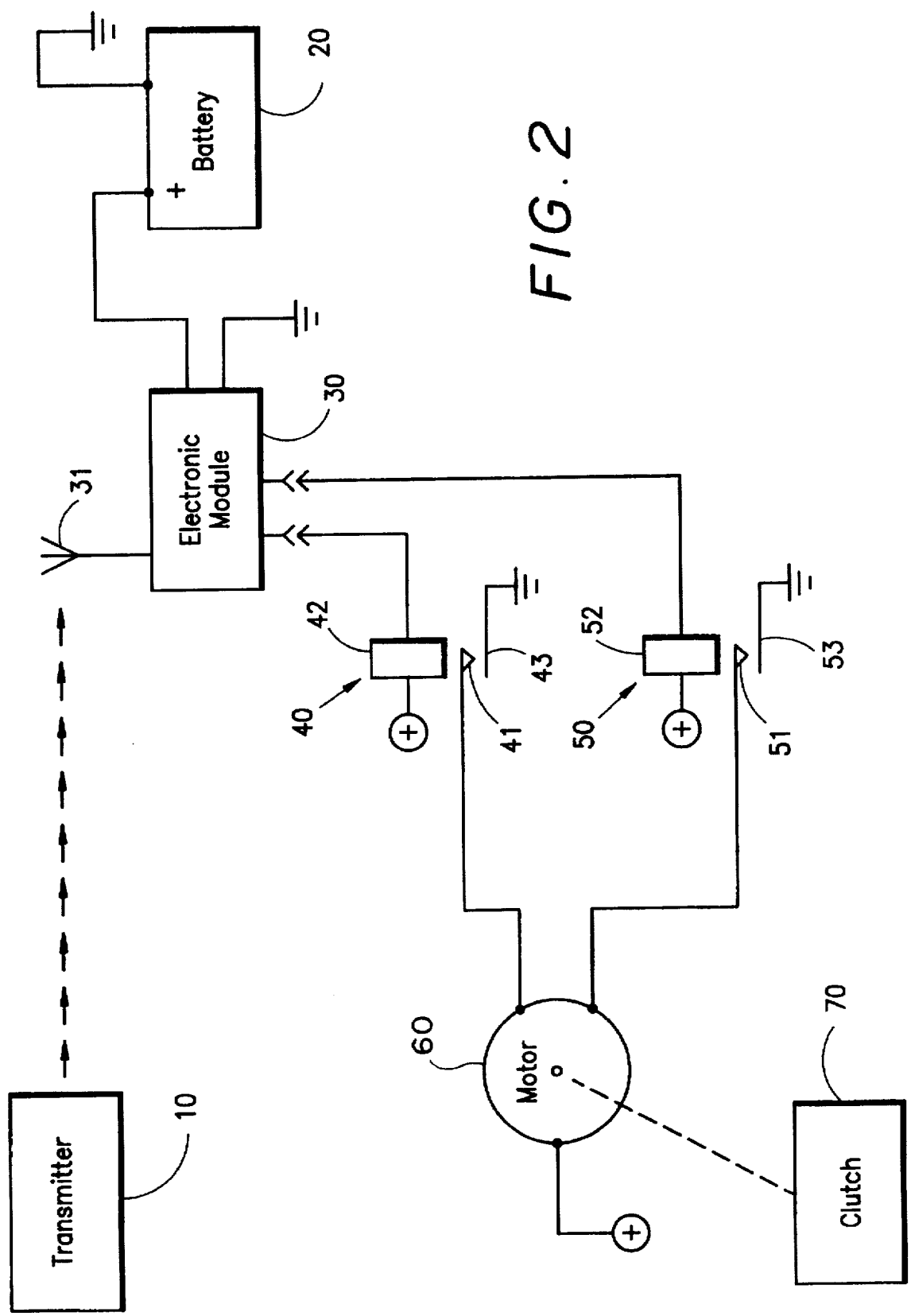
FIG. 2 is a diagram similar to FIG. 1 of a second embodiment of the anti-theft device according to the invention connected to a clutch.

A second embodiment of the anti-theft device is illustrated in FIG. 2. The second embodiment of the anti-theft device is identical to the first embodiment illustrated in FIG. 1 except the mechanical mechanism operated by the gear motor 60 of the anti-theft device connects to a clutch of a vehicle with a manual transmission rather than to an automatic transmission.

The transmitter 10, the battery 20, the electronic module 30, the lock relay 40 and the unlock relay 50 of the first and second embodiments may be viewed as a control configuration.

Figure 3:
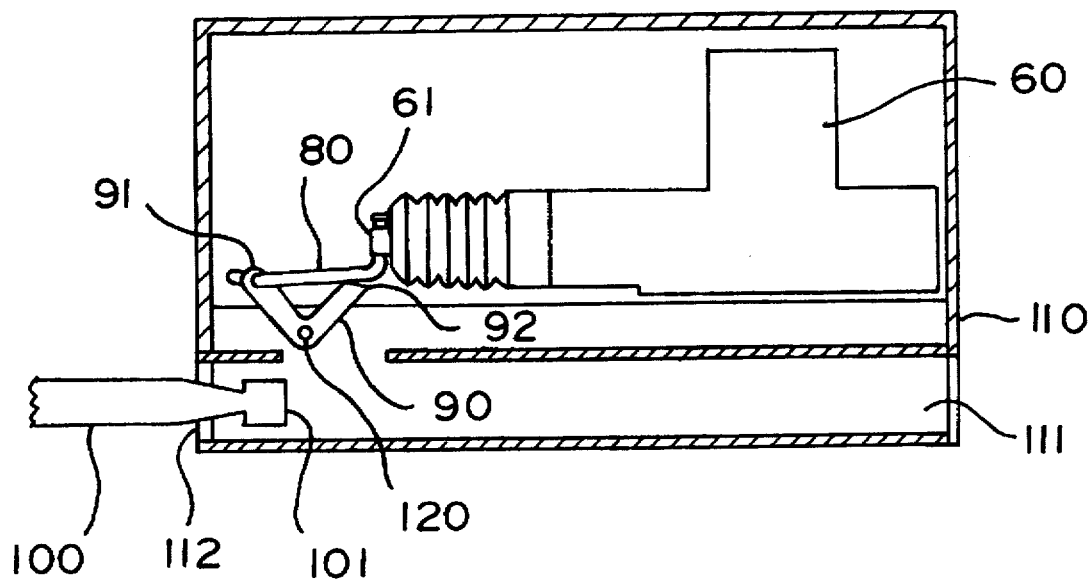
FIG. 3 is a cross-sectional view of a housing containing a gear motor and a locking mechanism in an unlocked position.
Figure 4:
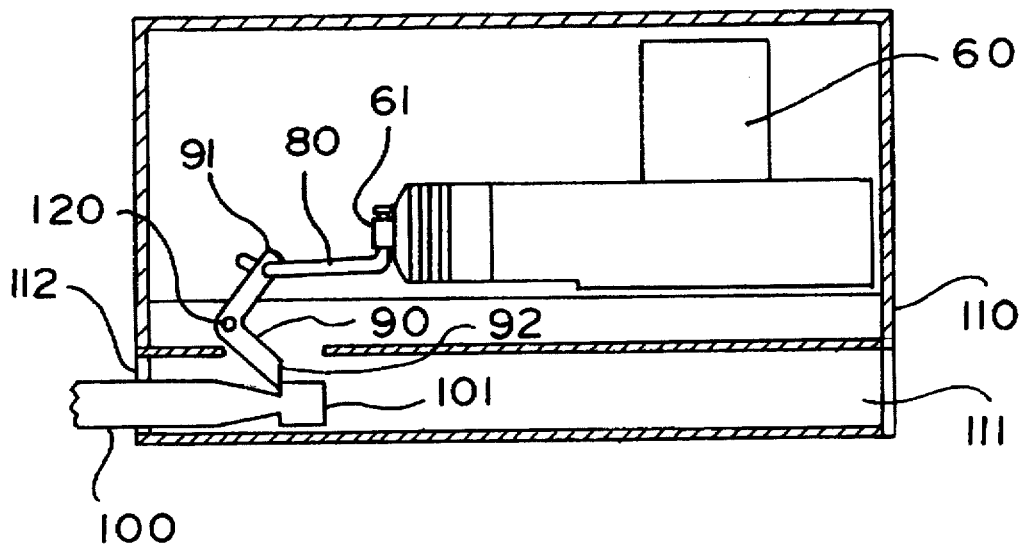
FIG. 4 is a cross-sectional view of the housing containing the gear motor and the locking mechanism in a locked position.

The mechanical mechanism connected to the gear motor 60 for locking the transmission of the first embodiment and the clutch of the second embodiment is illustrated in FIGS. 3 and 4. FIG. 3 illustrates an unlocked position of the mechanical mechanism, whereas FIG. 4 illustrates a locked position of the mechanical mechanism.

As illustrated in FIGS. 3 and 4, the gear motor and the mechanical mechanism are disposed in a guide or housing 110. The housing 110 may be placed anywhere on or in the vehicle. In a preferred embodiment the housing 110 is disposed in the engine compartment. The gear motor 60 has an eyelet 61 on an end of the gear motor 60. An end of a pin 80 is fixedly disposed in the eyelet 61 of the gear motor.

The mechanical mechanism also includes a pivotal lock element 90 which pivots on a pivot pin 120 connected to the housing 110. The pivot pin 120 is disposed transversely to the lock element 90. One end 91 of the lock element 90 has a bore formed therein. The other end of the pin 80 is fixedly disposed in the bore of the lock element 90. The pin 80, the lock element 90 and the pivot pin 120 may be viewed as a pivotal locking device.

The housing 110 has a channel 111 formed therein, which penetrates completely through the housing. If the gear motor 60 receives a lock signal from the electronic module 30, the gear motor 60 pulls or retracts as illustrated in FIG. 4. As a result, the lock element 90 pivots to a locked position in such a way that the other end 92 of the lock element 90 is disposed in the channel 111 of the housing 110.

If the gear motor 60 receives an unlock signal from the electronic module 30, the gear motor 60 pushes or extends as illustrated in FIG. 3. Consequently, the lock element 90 pivots to an unlocked position in such a way that the other end 92 of the lock element 90 is disposed within the housing 110, but completely outside the channel 111.

The mechanical mechanism for locking a transmission or a clutch also includes an operative connection 100, which in the preferred embodiments is either a cable or rod, a fraction of which is illustrated in FIGS. 3 and 4. One end of the cable 100 is a notched end 101. In the preferred embodiment the notch is formed cylindrically around the end 101 of the cable 100. Additionally, a steel jacket cable is preferred if a cable is used as the operative connection 100.

If the lock element 90 is in the unlocked position, the cable or rod 100 moves or slides freely in the channel 111. On the other hand, if the lock element 90 is in the locked position, the lock element 90 prevents the notched end 101 of the cable or rod 100 from sliding to an end 112 of the channel 111 by engaging in the notched end 101 of the cable. In other words the cable or rod 90 cannot completely withdraw from the housing 110.

As illustrated in FIG. 5, the other end 102 of the cable or rod 100 is connected to a gear lever 71 of an automatic transmission 70 according to the first embodiment of the invention. If the lock element 90 is in the unlocked position, the gear lever 71 and the automatic transmission operate normally. A driver inside the vehicle changes gears by moving a gear shift arm to a desired position causing the gear lever 71 to pivot.

To activate the anti-theft device, on the other hand, according to the first embodiment of the invention, the operator first places the vehicle in park. Placing the vehicle in park places the gear lever 71 in a defined position in which the notched end 101 of the cable or rod 100 is disposed within the channel 111 of the housing 110 adjacent the lock element 90. Then the operator presses the lock button on the transmitter 10 to transmit a lock signal. As described above, transmission of a lock signal causes the lock element 90 to pivot to the locked position. As a result, the lock element 90 engages the notched end 101 of the cable 100, preventing the gear lever 71 from pivoting out of the parked position despite any attempts by an operator to change gears from inside the vehicle. A thief, therefore, may break into the vehicle and even start the gear motor, but the thief would not be able to drive the vehicle away from the scene.

If the owner of a vehicle having the anti-theft device according to the invention desires to drive the vehicle, the owner presses the unlock button on the transmitter 10. The lock element 90 disengages from the notched end 101 of the cable 100 so that the owner may shift gears at will.

A second embodiment of the anti-theft device for connection with a clutch of a vehicle with a manual transmission is illustrated in FIGS. 6 and 7. A clutch lever 71' is connected to a clutch 70. A connector 103 interconnects the other end 102 of the cable or rod 100, the clutch lever 71' and a clutch pedal arm 72. The connector 103 according to the preferred embodiment has a hollow quadrilateral shape. Additionally, a side wall 104 and a side wall 105 of the connector 103 each have a bore formed therein.

The other end 102 of the cable or rod 100 passes through the bore in the side wall 104 and is attached to the side wall 104, for example, with a nut engaging threads on the other end 102.

The clutch lever 71' is disposed in the hollow of the connector 103 adjacent side wall 105. The clutch lever 71' has a bore formed therein corresponding to the bore in the side wall 105 of the connector 103. The clutch pedal arm 72 is disposed through the bores in the side wall 105 and the clutch lever 71' for connection with the connector 103 and clutch lever 71'. In a preferred embodiment, the clutch pedal arm 72 has a threaded end. The clutch pedal arm 72 attaches to the clutch lever 71' and the connector 103 with a nut threaded onto the threaded end of the clutch pedal arm 72.

In an exemplary embodiment, a spring is disposed between the end of the clutch pedal arm 72 attached to the connector 103 and the end 102 of the cable or rod 100 attached to the connector 103. As a result, the spring is disposed within the hollow connector 103. The spring reduces any rattling caused by the connection between the clutch pedal arm 72, the clutch lever 71', the cable or rod 100, and the connector 103.

If the lock element 90 is in the unlocked position, the clutch 70 operates normally. A driver inside the vehicle engages the clutch by pressing a clutch pedal connected to the clutch pedal arm 72 before changing gears of the manual transmission.

To activate the anti-theft device, on the other hand, according to the second embodiment of the invention, the operator first presses the clutch pedal to a pressed position. Pressing the clutch pedal places the clutch pedal arm 72 in a defined position in such a way that the notched end 101 of the cable or rod 100, which is connected to the clutch pedal arm 72, is disposed within the channel 111 of the housing 110 adjacent the lock element 90. Then the operator presses the lock button on the transmitter 10 to transmit a lock signal. As described above, transmission of a lock signal causes the lock element 90 to pivot to the locked position. As a result, the lock element 90 engages the notched end 101 of the cable 100, preventing the clutch pedal arm 72 from disengaging the clutch 70 despite release of the clutch pedal by the operator inside the vehicle. A thief, therefore, may break into the vehicle and even start the gear motor, but the thief would not be able to disengage the clutch and drive the vehicle away from the scene.

If the owner of a vehicle having the anti-theft device according to the second embodiment of the invention desires to drive the vehicle, the owner presses the unlock button on the transmitter 10. The lock element 90 disengages from the notched end 101 of the cable 100 so that the clutch lever 71' disengages the clutch 70. The owner of the vehicle may then engage and disengage the clutch 70 at will.

I claim:

1. An anti-theft device for a vehicle with an automatic transmission having a gear lever with a park position, comprising:

a control configuration having a first terminal for outputting a lock signal and a second terminal for outputting an unlock signal;

a push-pull gear motor having a first terminal connected to said first terminal of said control configuration for receiving said lock signal and a second terminal connected to said second terminal of said control configuration for receiving said unlock signal, said push-pull gear motor having an actuator movable between an extended and a retracted position upon receiving said signals, and being otherwise fixed in one of said positions;

a pivotal locking device connected to said actuator, said locking device being in a locked position when said actuator is in one of said positions and being in an unlocked position when said actuator is in the other of said positions; and an operative connection having a first end being engaged by said locking device in said locked position, and a second end for connection to the gear lever of the transmission; and said control configuration causing said locking device to engage said operative connection by outputting said lock signal when the vehicle is in the park position for disabling gear selection of the vehicle by securing the gear lever in the park position and said control configuration outputting said unlock signal for enabling gear selection of the vehicle.

2. The anti-theft device according to claim 1, wherein said pivotal locking device includes a pivotal lock element having a bore formed therein, a stationary pivot pin disposed transversely to said actuator of said push-pull gear motor and passing through said bore in said pivotal lock element, and a pin connecting said actuator and said pivotal lock element, said pivotal lock element engaging said first end of said operative connection in said locked position.

3. The anti-theft device according to claim 2, wherein said pivotal lock element is v-shaped.

4. An anti-theft device for a vehicle with an automatic transmission having a gear lever selectively moved to a plurality of positions including a park position, comprising:

a control configuration having a first terminal for outputting a lock signal and a second terminal for outputting an unlock signal;

a push-pull gear motor having a first terminal connected to said first terminal of said control configuration for receiving said lock signal and a second terminal connected to said second terminal of said control configuration for receiving said unlock signal, said push-pull gear motor having an actuator movable between an extended and a retracted position upon receiving said signals;

an operative connection including a jacket cable member having a first end, and a second end connected to said gear lever;

elongated channel means for housing said first end;

a pivotal locking device connected to said actuator, said pivotal locking device being in a locked position when said actuator is in one of said positions and being in an unlocked position when said actuator is in the other of said positions and .said pivotal locking device engages said first end only when said gear lever is in said park position and in a locked position, and said control configuration causing said locking device to engage said operative connection by outputting said lock signal when the vehicle is in the park position for disabling gear selection of the vehicle by securing the gear lever in the park position and said control configuration outputting said unlock signal for enabling gear selection of the vehicle.

5. The anti-theft device for a vehicle according to claim 4 wherein said control configuration includes a transmitter for transmitting said signals.

6. The anti-theft device according to claim 5, wherein said transmitter is a hand-held transmitter.

7. The anti-theft device for a vehicle according to claim 5, wherein said control configuration includes:

an electronic module with an antenna for receiving said signals from said transmitter, a ground terminal connected to ground, a positive terminal connected to a positive terminal of a battery, a lock terminal for outputting said lock signal, and an unlock terminal for outputting said unlock signal lock relay connected to said lock terminal of said electronic module and having a lock contact spring, said first terminal of said push-pull gear motor connected to said lock contact spring, and an unlock relay connected to said unlock terminal of said electronic module and having an unlock contact spring, said second terminal of said second terminal of said push-pull gear motor connected to said unlock contact spring.

* * * * *